3,182,058
NITROFURAN DERIVATIVES
Lloyd H. Conover, Quaker Hill, Conn., assignor to Chas. Pfizer & Co., Inc., New York, N.Y., a corporation of Delaware
No Drawing. Filed Oct. 31, 1960, Ser. No. 65,964
7 Claims. (Cl. 260—240)

This invention relates to new and useful derivatives of nitrofuran, and it is especially concerned with compounds of the foregoing type which have been found to be effective as antimicrobial agents. More particularly, this invention deals with various N-substituted nitrofurantoins which are valuable in the treatment of urinary tract infections.

In accordance with the present invention, the N-substituted nitrofurantoins involved all possess the following general structural formula:

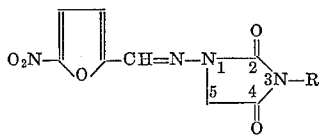

wherein R is a member selected from the group consisting of acyl derived from a hydrocarbon carboxylic acid having from two to eight carbon atoms, carboxymethyl, carbalkoxymethyl and carbaralkoxymethyl, wherein the alcohol moiety of the ester group is derived from a hydrocarbon radical containing up to ten carbon atoms. Typical of the compounds which are included within this class are such N-substituted nitrofurantoins as 1-(5-nitro-2-furfurylideneamino)hydantoin-3-acetic acid, ethyl 1-(5-nitro-2-furfurylideneamino)hydantoin-3-acetate, 1-(5-nitro-2-furylideneamino)-3-acetylhydantoin, and the like. All the members of this series allow an excretion in the urine of dosed subjects which is highly antibacterial in character.

In accordance with the process employed for the preparation of these compounds, 5-nitro-2-furfural or one of its acid hydrolyzable derivatives, such as the diacetate or aldoxime, is contacted with an appropriately substituted 1-(aralkylideneamino)hydantoin of the formula:

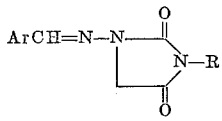

wherein R is as previously defined except that R can also be hydrogen, and Ar is an aromatic hydrocarbon moiety which will provide an aldehyde group such as benzaldehyde or salicylaldehyde that can be interchanged readily with or by a 5-nitro-2-furfural group. In the case where R is hydrogen, the resulting nitrofurantoin can then be further reacted with the desired reagent of choice in the same manner as the corresponding N-aralkylidene compound, and preferably with an acid anhydride as hereinafter described, to form the desired N-substituted nitrofurantoin. In the case where R in the above formula is either carbalkoxymethyl or carbaralkoxymethyl, the corresponding compound obtained is always 1-(5-nitro-2-furfurylideneamino)hydantoin-3-acetic acid, i.e., R becomes carboxymethyl during the course of the reaction. The desired esters can then be prepared from the latter compound in the usual manner, viz., by esterifying it with the appropriate alcohol in accordance with the classical methods of organic chemistry. Typical examples of such alcohols for use in this connection include methanol, ethanol, isopropanol, n-butanol, n-heptanol, benzyl alcohol, β-phenylethanol, and the like. Alternatively, it is sometimes even more desirable to convert a lower alkyl ester of 1-(5-nitro-2-furfurylideneamino)hydantoin-3-acetic acid into the corresponding ester of one of the aforementioned higher boiling alcohols by means of the well-known transesterification technique. However, it is to be understood that the approach previously indicated is the preferred method if the lower alkyl esters are the desired products and it is the only method available in the case of the methyl ester except for the fact that diazomethane may also be employed.

In connection with the aforementioned interchange reaction, 5-nitro-2-furfural and the appropriate 1-(aralkylideneamino)-3-substituted hydantoin compound are contacted with one another in the presence of a dilute mineral acid and under the influence of heat. In general, this particular reaction is ordinarily carried out in the presence of a small quantity of, say, for example, from about 1.0% to about 15% of a strong mineral or organic acid like concentrated hydrochloric acid, concentrated sulfuric acid, 85% ortho phosphoric acid, chloroacetic acid, p-toluensulfonic acid, and so forth. Although it is quite common to carry out this step in water alone as the hydrolytic medium, it is usually preferable to employ other reaction-inert, polar organic water-miscible solvents either alone or in conjunction therewith in order to facilitate proper solution of all the reactants. Such solvents which may be employed for this purpose include lower alkanols such as methanol, ethanol, isopropanol, and the like, lower alkane hydrocarbon carboxylic acids such as formic acid, acetic acid, propionic acid, and the like, and N,N-di(lower alkyl)substituted derivatives of the amides of such acids like dimethylformamide, dimethylacetamide, diethylformamide, diethylacetamide and so forth, as well as lower alkyl nitriles such as acetonitrile, propiononitrile, and the like, and lower alkyl sulfoxides and sulfones such as dimethyl sulfoxide, dimethyl sulfone, diethyl sulfoxide, di-n-propyl sulfone, and the like. The reaction may be prompted by heating, as aforesaid, and in practice it is ordinarily desirable to conduct this step at the reflux temperature of the reaction mixture, i.e., up to the boiling point of the hydrolytic medium or solvent employed, although any temperature within the range of from about 35° C. to about 150° C. may be used to advantage for this particular purpose provided the heating is maintained for a period of from about one-quarter to about five hours. Completion of the reaction is ensured by distillation of the so-treated mixture via conventional means, whereby the more volatile aromatic aldehyde is removed and the higher boiling 5-nitro-2-furfural moiety takes the place of the latter in the 1-(substituted)amino-hydantoin molecule.

The aforementioned 1-(aralkylideneamino)hydantoins used as starting materials in the interchange reaction are all readily prepared in accordance with the conventional methods of organic chemistry. For instance, the following equation illustrates the general process used to introduce the desired substituent group into the 3-position of the N-unsubstituted 1-(aralkylideneamino)hydantoin molecule:

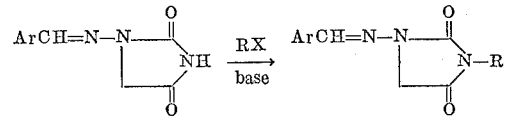

In this instance, R represents the previously defined acyl group and X represents a halogen atom such as chlorine, bromine or iodine. Typical examples of RX include acetyl chloride, acetyl bromide, propionyl chloride, isovaleryl chloride, n-heptoyl chloride, benzoyl chloride, benzoyl bromide, phenylacetyl chloride, etc. Although it is possible to employ any basic agent in order to effect this type reaction, it is preferable in the present instance to use such acid-binding agents as the alkali metals or their hydride, hydroxide, carbonate, alcoholate, amide and organo-metallic derivatives. Preferred acid-binding agents in this connection include metallic sodium, sodium hydride, potassium hydroxide, lithium hydroxide, sodamide, sodium tertiary-butylate and lithium methyl. The reaction is also usually carried out in an organic diluent which is a solvent for at least one of the reactants and preferably one in which both reactants are mutually miscible. Among the various organic diluents which can be employed for this particular purpose are such solvents as the aromatic hydrocarbons like benzene, toluene, xylene, etc., lower dialkyl sulfoxides such as dimethyl sulfoxide, di-n-propyl sulfoxide, and the like, lower dialkyl sulfones such as dimethyl sulfone, diethyl sulfone, di-isopropyl sulfone, and so forth, and N,N-di(lower alkyl)derivatives of lower alkane hydrocarbon carboxamides like dimethylformamide, dimethylacetamide, diethylformamide, diethylacetamide, and so on. In general, this reaction is ordinarily conducted at or near a temperature which is in the neighborhood of the boiling point of the solvent, although any temperature in the range of from about 50° C. to about 200° C. is suitable provided the heating period is maintained for about one to about 24 hours.

In the case where R is carboxymethyl, carbalkoxymethyl or carbaralkoxymethyl, the desired 1-(aralkylideneamino)hydantoin compound is prepared in the same manner as hereinbefore discussed except that the reagents employed are an aromatic aldehyde semicarbazone and an α-haloacetic acid ester. In this instance, the product initially obtained is a hydantoin of the aforesaid type where R is either a carbalkoxymethyl or a carbaralkoxymethyl group. This reaction is illustrated below by means of the following equation wherein X is halogen and R' is a hydrocarbon radical containing up to ten carbon atoms:

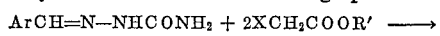

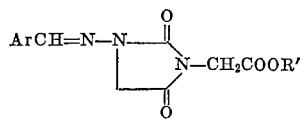

Moreover, it is also possible to prepare products of the type previously discussed by employing variations of this particular type reaction procedure as is illustrated below by the following series of equations wherein all the symbols having the same meaning as hereinbefore defined:

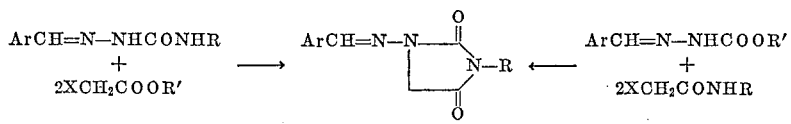

In accordance with a more specific embodiment of the process employed to prepare the 1-(aralkylideneamino)-hydantoin-3-acetate intermediates of this invention (as outlined above in the first of the two foregoing equations), the reaction between the aromatic aldehyde semicarbazone and α-haloacetic acid ester is generally carried out by mixing the two reactants together in a reaction-inert polar organic solvent containing an equimolar amount of a basic condensing agent with respect to the α-halo ester and then stirring the resultant mixture at or near room temperature. The preferred condensing agent for this particular purpose is sodium hydride, although any of the other previously mentioned agents used in connection with the acyl halide condensation reaction as hereinbefore discussed are also of some value in the present instance. Furthermore, it is only necessary that the α-haloacetate be present in any amount that is at least twice that of the aromatic aldehyde semicarbazone on a molar basis, a slight excess of the ester reagent not being harmful in this respect. As a matter of fact, the use of such a slight excess of reagent in this particular connection may even prove to be beneficial to the reaction inasmuch as it thereby serves to shift the equilibrium of the system to the right hand side of the equation. Preferred reaction-inert solvents for use in this process include such N,N-di(lower)alkyl substituted derivatives of lower alkane hydrocarbon carboxamides like N,N-dimethylformamide, N,N-diethylformamide, N,N-dimethylacetamide, and so forth, as well as such lower alkanols as methanol, ethanol, isopropanol, and the like. In some instances when a lower alkyl α-haloacetic acid ester is employed as the starting material, it is even possible to conduct the reaction in the absence of a solvent. In such cases, it may be convenient to distill off the volatile alcohol by-product as it is formed so as to force the reaction to completion by shifting the equilibrium to the right hand side of the equation, but this is not absolutely necessary nor is it even desirable if deleterious effects were to ensue due to the higher temperature. Hence, it is usually more feasible to conduct the process in a reaction-inert polar organic solvent system as aforesaid, especially if the two reactants are not mutually miscible with one another.

The starting materials which are employed in the process referred to above are either readily available commercially or else they can easily be prepared by those skilled in the art via any number of conventional synthetic methods. For instance, the α-haloacetic acid esters which are used as the initial reactants in the foregoing process as outlined by the first reaction equation are readily obtainable by esterifying the parent α-haloacetic acid with the appropriate alcohol in the same manner as hereinbefore indicated. The aromatic aldehyde semicarbazones and N-substituted carbazates are, of course, both prepared from their two respective component reagents by condensing them in the classical manner familiar to every chemist.

As previously mentioned, the N-acyl nitrofurantoins of this invention where R is acyl can be prepared directly from the unsubstituted parent heterocyclic compound by using either a Schotten-Baumann type reaction with an acyl halide as hereinbefore discussed or by employing the corresponding acid anhydride in the presence of a basic salt, such as an alkali metal salt of the corresponding organic acid, which will react the organic acid by-product so-produced, thereby ensuring completion of the reaction. Alternatively, it is also possible to employ a catalytic amount of a suitable condensing agent such as $ZnCl_2$ in order to effect this particular reaction, rather than the basic salt referred to above. In practice, it is quite common to employ an excess of the anhydride not only to shift reaction equilibrium to the product side of the equation, but also to provide a suitable solvent medium in which the reaction can take place. In general, the acylation reaction is ordinarily conducted at a temperature that is in the range of from about 45° C. up to about 170° C. for a period of about one-half to about twenty hours, although in practice it is usually desirable to carry out the process at the reflux temperature of the reaction mixture provided the boiling point of the solvent is within the aforesaid temperature range.

As previously indicated, the herein described N-substituted nitrofurantoins of this invention are readily adapted to therapeutic use as antimicrobial agents and/or as urinary antiseptics. For instance, ethyl 1-(5-nitro-2-furfurylidene-amino)hydantoin-3-acetate exhibits excellent activity in vivo when administered to rats that are infected with *Proteus vulgaris*. Furthermore, the toxicity of these compounds has been found to be quite low when they are administered to mice in amounts that are sufficient to achieve the desired therapeutic effects. Moreover, no other harmful pharmacological side effects have been observed to occur as a result of their administration.

In accordance with a method of treatment of the present invention, one of the herein described nitrofurantoins effective in combatting antibiotic-resistant strains of bacteria can be given to an infected subject via the oral route. In general, these compounds are most satisfactorily administered to said subjects in doses that are substantially of the same order of magnitude as those employed in the case of nitrofurantoin itself. Nevertheless, it is to be appreciated that still other variations may also occur in this respect, depending upon the species of animal being treated and its individual response to said medicament, as well as on the particular oral formulation chosen and the time period and interval at which such administration is carried out. In some instances, dosage levels below those normally employed in the case of nitrofurantoin may be more than adequate, while in other cases still larger dosages may be employed without causing any harmful or deleterious side effects provided that such higher levels are first divided into several smaller doses that are to be administered throughout the day.

In connection with the use of the N-substituted nitrofurantoins of this invention for the treatment of subjects afflicted with antibiotic-resistant infections, it is to be noted that they may be administered either alone and/or preferably in combination with a pharmaceutically acceptable carrier, and that such administration can be carried out in both single and multiple dosages. More particularly, the novel compounds of this invention can be administered in a wide variety of different dosage forms wherein they are combined with various pharmaceutically acceptable inert carriers in the form of tablets, capsules, lozenges, troches, hard candies, powders, aqueous suspensions, elixirs, syrups, and the like. Such carriers include solid diluents or fillers, liquid aqueous media and various non-toxic organic solvents, etc. Moreover, such oral pharmaceutical compositions can be sweetened and/or flavored by means of various agents of the type commonly employed for just such a purpose. In general, the therapeutically-effective compounds of this invention are present in such dosage forms at concentration levels ranging from about 0.5% to about 90% by weight of the total composition, i.e., in amounts which are sufficient to provide the desired unit dosage previously indicated.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia; in addition, lubricating agents such as magnesium stearate, sodium lauryl sulfate and talc are often very useful for tabletting purposes. Solid compositions of a similar type may also be employed as fillers in soft elastic and hard-shelled gelatin capsules; preferred materials in this connection would also include lactose or milk sugar as well as high molecular weight polyethylene glycols. When aqueous suspensions and/or elixirs are desired for oral administration, the essential active ingredient may be combined with various sweetening and flavoring agents, coloring mater or dyes and, if so desired, emulsifying and/or suspending agents, together with such diluents as water, ethanol, propylene glycol, glycerin, and various like combinations thereof.

This invention is further illustrated by the following examples, which are not to be construed as imposing any limitations on the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

A solution consisting of 32.6 g. (0.2 mole) of benzaldehyde semicarbazone dissolved in 300 ml. of freshly distilled dimethylformamide was subjected to constant agitation under a dry nitrogen atmosphere, while 2.4 g. (0.1 mole) of sodium hydride (50% dispersion in oil) were added portionwise to the stirred reaction mixture. After the evolution of hydrogen gas had ceased and a clear solution was obtained, there were then added 12.2 g. (0.1 mole) of ethyl chloroacetate in a rapid manner to afford a milky-white mixture that was subsequently stirred for an additional four hours at room temperature. To this well-stirred mixture there were then added an additional 3.6 g. (0.15 mole) of sodium hydride and after hydrogen evolution had ceased, 18.8 g. (0.15 mole) of ethyl chloroacetate. This particular sequence of steps was then repeated once again, employing a final stirring period of 18 hours. The solid material which crystallized at this point was removed by means of filtration and subsequently washed with cold water and then air-dried to constant weight to afford to a 30.1 g. yield of product. The original solvent filtrate so obtained was then concentrated under reduced pressure to afford a residual oil, which subsequently yielded an additional 2.3 g. of product in the form of a crystalline precipitate upon the addition thereto of a small amount of water. Both fractions melted in the range of 187–195° C. and were subsequently combined to afford a total yield of 32.4 g. (56%) of ethyl 1-(benzylideneamino)hydantoin-3-acetate, M.P. 210–215° C. d. after one recrystallization from acetone.

*Analysis.*—Calcd. for $C_{14}H_{15}N_3O_7$: C, 58.12; H, 5.23; N, 1454; OEt, 15.57. Found: C, 58.27; H, 5.42; N, 14.62; OEt, 15.45.

*Example II*

A well-stirred solution consisting of 10 g. (0.055 mole) of 1-(benzylideneamino)hydantoin dissolved in 150 ml. of freshly distilled dimethylformamide was treated portion-wise with 1.3 g. (0.054 mole) of sodium hydride (50% dispersion in oil) in the manner of the previous examples. Hydrogen gas evolution ceased after one hour and 4.3 g. (0.055 mole) of acetyl chloride were slowly added to the cooled, clear reaction mixture. After the latter was allowed to stand for five days at room temperature, the solvent was removed in vacuo and the residual solid material so obtained was collected by means of filtration, washed with water and air-dried to constant weight. In this manner, there was obtained a 10.4 g. (78%) yield of 1-(benzylideneamino)-3-acetylhydantoin, M.P. 187–195° C., which after two recrystallizations from acetonitrile-ethanol afforded an analytically pure sample.

*Analysis.*—Calcd. for $C_{12}H_{11}N_3O_3$: C, 58.77; H, 4.52; N, 17.14. Found: C, 58.86; H, 4.70; N, 17.37.

*Example III*

The procedure described in Example II is followed except that other acyl halides are individually employed as starting materials in lieu of acetyl chloride. The following list of such reagents is presented below in order to illustrate this point as well as to avoid unnecessary repetition of experimental detail:

Acetyl bromide
Propionyl chloride
n-Butyryl chloride
Isovaleryl chloride
n-Caproyl chloride
n-Heptoyl chloride
Benzoyl chloride
Benzoyl bromide
Phenylacetyl chloride

*Example IV*

A solution consisting of 11 g. (0.045 mole) of 5-nitrofurfural diacetate dissolved in 100 ml. of ethanol was added dropwise to a refluxing solution of 13.4 g. (0.045 mole) of ethyl 1-(benzylideneamino)hydantoin-3-acetate in 310 ml. of ethanol containing 75 ml. of 5% sulfuric acid. After this addition was complete, the reaction mixture was refluxed for one more hour and then subjected to ordinary distillation until 100 ml. of volatiles had been removed. The latter was then replaced with a 100 ml. portion of 50% ethanol and the foregoing distillation procedure repeated until no further benzaldehyde odor could be detected. The added solvent was then reduced in volume to one-quarter of its original volume by means of evaporation under reduced pressure, and the resulting yellow crystalline product was collected by means of filtration, washed with water and air-dried to constant weight. In this manner, there was obtained a 9.1 g. (66.5%) yield of 1-(5-nitro-2-furfurylideneamino)hydantoin-3-acetic acid (M.P. 246–248° C. d.), which after two recrystallizations from acetonitrile afforded yellow crystals melting at 263–264° C.

Analysis.—Calcd. for $C_{10}H_8N_4O_7$: C, 40.55; H, 2.72; N, 18.72. Found: C, 40.66; H, 2.78; N, 18.99.

*Example V*

A solution consisting of 25 g. (0.077 mole) of 1-(5-nitro-2-furylideneamino)hydantoin-3-acetic acid dissolved in 500 ml. of ethanol was saturated with dry gaseous hydrogen chloride, and the resultant mixture was refluxed for one hour to give a dark brown solution. Upon cooling to room temperature, a brown precipitate was obtained which was then separated from the reaction mixture by means of filtration and subsequently recrystallized from ethanol-acetonitrile to give 17.2 g. of ethyl 1-(5-nitro-2-furfurylideneamino)hydantoin-3-acetate as a yellow crystalline product, M.P. 150.4–158.2° C.

Analysis.—Calcd. for $C_{12}H_{12}N_4O_7$: C, 44.45; H, 3.70; N, 17.28. Found: C, 44.38; H, 3.23; N, 17.03.

*Example VI*

The procedure described in Example V was followed except that methanol instead of ethanol was the alkanol employed and the reaction mixture so obtained was refluxed for a five hour period. In this particular case, it was first necessary to remove approximately two-thirds of the reaction solvent by means of evaporation under reduced pressure before crystallization of the desired product occurred. In this manner, there was obtained a 20.7 g. (84.5%) yield of methyl 1-(5-nitro-2-furfurylideneamino)hydantoin-3-acetate, M.P. 190.6–194.8° C. After one recrystallization from ethanol, the melting point was raised to 196–200° C.

Analysis.—Calcd. for $C_{11}H_{10}N_4O_7$: C, 42.59; H, 3.25; N, 18.06. Found: C, 43.07; H, 3.20; N, 18.06.

*Example VII*

A variety of esters of 1-(5-nitro-2-furfurylideneamino)-hydantoin-3-acetic acid other than the previously reported methyl and ethyl esters are obtained in accordance with this very same standard esterification procedure as described in Example V, except that the appropriate alcohol was substituted for ethanol in each particular case as the desired reagent of choice. The esters specifically prepared in this manner include the isopropyl, n-butyl, isoamyl, n-hexyl, n-heptyl, 2-ethylhexyl, n-octyl, n-decyl, benzyl and β-phenylethyl esters of the aforesaid acid.

*Example VIII*

One gram (0.00314 mole) of methyl 1-(5-nitro-2-furfurylideneamino)hydantoin-3-acetate was dissolved in 50 ml. of n-propanol containing one drop of concentrated sulfuric acid and the resulting solution refluxed for approximately 16 hours. After this step was complete, the reaction mixture was slowly cooled to room temperature whereupon a yellow crystalline precipitate was soon observed to form. The crystalline material so obtained was then collected on a filter funnel by means of suction filtration and air-dried to constant weight to afford 0.8 g. (73.5%) of n-propyl 1-(5-nitro-2-furfurylideneamino)-hydantoin-3-acetate, M.P. 153–156° C. After one recrystallization from ethanol and then another from ethyl acetate, the melting point was raised to 158–159° C. On admixture with an authentic sample prepared in accordance with the procedure of Example VII, no depression in the melting point could be observed.

Analysis.—Calcd. for $C_{13}H_{14}N_4O_7$: C, 46.16; H, 4.17; N, 16.56. Found: C, 46.39; H, 4.04; N, 16.31.

*Example IX*

The procedure described in Example VIII is followed except that isopropanol was used in place of the n-propanol of the previous example. In this particular case, the corresponding product obtained was isopropyl 1 - (5 - nitro - 2 - furfurylideneamino)hydantoin - 3 - acetate, M.P. 173–177° C. A mixed melting point determination of this compound together with a sample of the corresponding product prepared in Example VII revealed no observable depression.

Analysis.—Calcd. for $C_{13}H_{14}N_4O_7$: C, 46.16; H, 4.17; N, 16.56. Found: C, 45.52; H, 3.98; N, 16.50.

*Example X*

The procedure described in Example VIII was followed except that ethylene glycol is the transesterification reagent used instead of n-propanol. Thus, when 8 g. (0.0252 mole) of methyl 1-(5-nitro-2-furfurylideneamino)hydantoin-3-acetate and 200 ml. of ethylene glycol containing three drops of concentrated sulfuric acid were heated at 110° C. for five hours, the corresponding product obtained was β-hydroxyethyl 1-(5-nitro-2-furfurylideneamino)hydantoin-3-acetate. This product was isolated by first removing approximately one-half of the reaction solvent via evaporation under reduced pressure and then slowly cooling the resulting concentrate by allowing it to stand overnight in an ice box at approximately 5° C. In this manner, there was obtained a crystalline crop that amounted to an 8.3 g. (95.5%) yield of the desired product melting at 175–179° C.

Analysis.—Calcd. for $C_{12}H_{12}N_4O_8$: C, 42.36; H, 3.56; N, 16.47. Found: C, 42.45; H, 3.47; N, 16.89.

*Example XI*

The procedure described in Example VIII is followed except that other higher boiling alcohols are employed in place of n-propanol. Specifically included in this category are such compounds as n-butanol, n-heptanol, benzyl alcohol, β-phenylethanol and n-decanol. In each and every case, the corresponding product obtained is the appropriate 1 - (5-nitro-2-furfurylideneamino)hydantoin-3-acetic acid ester, i.e., where the alcohol moiety in each ester exactly corresponds to the particular higher boiling reagent that was used for transesterification purposes in that particular instance. For instance, when methyl 1-(5-nitro - 2 - furfurylideneamino)hydantoin - 3 - acetate and n-heptanol react in this manner, the corresponding product obtained is n-heptyl 1-(5-nitro-2-furfurylideneamino)-hydantoin-3-acetate.

*Example XII*

A solution consisting of 10 g. (0.046 mole) of 1-(5-nitro-2-furfurylideneamino)hydantoin in 200 ml. of acetic anhydride containing 0.1 g. of zinc chloride was refluxed for two hours and then allowed to stand overnight at room temperature. The solids which formed were then collected by means of filtration, washed with ice-cold acetone and then with water. After air-drying to constant weight, the combined crystalline crops amounted to 6.8 g. (53%) and melted at 203–212° C. d. After one recrystallization from acetonitrile, there was obtained pure 1-(5-nitro-2-furfurylideneamino)-3-acetylhydantoin, M.P. 209–212° C.

Analysis.—Calcd. for $C_{10}H_8N_4O_6$: N, 20.00. Found: N, 20.45.

Example XIII

The procedure described in the previous example is followed except that other aliphatic hydrocarbon carboxylic acid anhydrides are individually employed in lieu of acetic anhydride and the temperature of the reaction mixture is not allowed to exceed 170° C. Such acid anhydrides which are specifically used in this instance include propionic anhydride, n-butyric anhydride, citraconic anhydride, n-valeric anhydride, n-heptoic anhydride, and benzoic anhydride. In each and every case, the corresponding 1 - (5-nitro-2-furfurylideneamino)-3-acylhydantoin is the product obtained.

Example XIV

The procedure described in Example IV is followed except that 11 g. (0.045 mole) of 1-(benzylideneamino)-3-acetylhydantoin is the starting material employed in lieu of that used in the aforementioned example. In this particular case, the corresponding product obtained is 1-(5-nitro - 2 - furfurylideneamino) - 3 - acetylhydantoin which is identical in every respect with the product reported in Example XII.

In like manner, each of the other 1-(benzylideneamino)-3-acylhydantoins reported in Example III are converted to the corresponding nitrofurantoins (many of which are identical with the products prepared in Example XIII) by subjecting them to this very same reaction procedure.

What is claimed is:
1. A N-substituted nitrofurantoin of the formula:

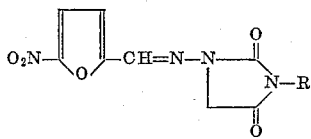

wherein R is a member selected from the group consisting of an acyl group of an alkane carboxylic acid having from 2 to 8 carbon atoms, citraconyl, benzoyl, phenylacetyl, carboxymethyl, carbalkoxymethyl, the alkoxy radical having up to 10 carbon atoms, and carbaralkoxymethyl, the aralkoxy radical corresponding to the following formula

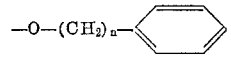

wherein $n$ is an integer from 1 to 2.

2. Ethyl 1-(5-nitro-2-furfurylideneamino)hydantoin-3-acetate.
3. 1-(5-nitro - 2 - furfurylideneamino)hydantoin-3-acetic acid.
4. 1-(5-nitro - 2 - furfurylideneamino)-3-acetylhydantoin.
5. A compound of claim 1 wherein R is an acyl group of an alkane carboxylic acid having from 2 to 8 carbon atoms.
6. A compound of claim 1 wherein R is carbalkoxymethyl, the alkoxy group having up to 10 carbon atoms.
7. A compound of claim 1 wherein R is carbaralkoxymethyl, the aralkoxy radical corresponds to the following formula

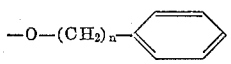

wherein $n$ is an integer from 1 to 2.

References Cited by the Examiner
UNITED STATES PATENTS

| | | | |
|---|---|---|---|
| 2,225,384 | 12/40 | Graenacher et al. | 260—309.5 XR |
| 2,610,181 | 9/52 | Hayes | 260—240 |
| 2,927,110 | 3/60 | Gever et al. | 260—240 |

OTHER REFERENCES

Chemical Abstracts, vol. 48, columns 3343–4 (1954), abstracts of Sanchez et al., Anales real soc. espan. fis. y quim., vol. 49, pages 51–6 (1953).

Jack: J. Pharm. and Pharmacol., vol. 11, Suppl. 108, T–114T (1959).

WALTER A. MODANCE, *Primary Examiner.*

IRVING MARCUS, *Examiner.*